(12) United States Patent
Vandikas et al.

(10) Patent No.: US 10,922,115 B2
(45) Date of Patent: Feb. 16, 2021

(54) COMMISSIONING OF VIRTUALIZED ENTITIES

(71) Applicant: TELEFONAKTIEBOLAGET LM ERICSSON (PUBL), Stockholm (SE)

(72) Inventors: Konstantinos Vandikas, Solna (SE); Elena Fersman, Stockholm (SE); Hongxin Liang, Upplands Väsby (SE); Leonid Mokrushin, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/740,541

(22) PCT Filed: Jun. 30, 2015

(86) PCT No.: PCT/SE2015/050761
§ 371 (c)(1),
(2) Date: Dec. 28, 2017

(87) PCT Pub. No.: WO2017/003328
PCT Pub. Date: Jan. 5, 2017

(65) Prior Publication Data
US 2018/0189091 A1    Jul. 5, 2018

(51) Int. Cl.
*G06F 9/455*    (2018.01)

(52) U.S. Cl.
CPC ............... *G06F 9/45558* (2013.01); *G06F 2009/45562* (2013.01); *G06F 2009/45575* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| | | |
|---|---|---|
| 8,959,513 B1 | 2/2015 | Swaminathan |
| 2012/0266164 A1 | 10/2012 | Anderson, III et al. |

(Continued)

FOREIGN PATENT DOCUMENTS

| | | |
|---|---|---|
| EP | 1693754 A2 | 8/2006 |
| EP | 2866141 A1 | 4/2015 |
| WO | 2015195006 A1 | 12/2015 |

OTHER PUBLICATIONS

European Communication with the extended European Search Report issued in Application No. 15897281.0 dated Jun. 1, 2018, 7 pages.

(Continued)

*Primary Examiner* — Charlie Sun
(74) *Attorney, Agent, or Firm* — Rothwell, Figg, Ernst & Manbeck, P.C.

(57) ABSTRACT

There is provided mechanisms for commissioning a virtualized entity in a computerized virtualization environment. A method is performed by the virtualized entity. The method comprises acquiring an indication for the virtualized entity to be commissioned. The method comprises acquiring environment data from the computerized virtualization environment for determining what kind of functionality the virtualized entity is to provide. The method comprises acquiring configuration parameters based on the environment data. The method comprises applying the configuration parameters, thereby commissioning the virtualized entity.

13 Claims, 5 Drawing Sheets

(56) References Cited

U.S. PATENT DOCUMENTS

| | | | |
|---|---|---|---|
| 2013/0111540 A1* | 5/2013 | Sabin | G06F 21/554 726/1 |
| 2013/0179881 A1 | 7/2013 | Calder et al. | |
| 2013/0232480 A1* | 9/2013 | Winterfeldt | G06F 8/60 717/177 |
| 2013/0297921 A1 | 11/2013 | Wright et al. | |
| 2014/0040887 A1 | 2/2014 | Morariu et al. | |
| 2014/0215461 A1* | 7/2014 | Laor | G06F 11/1438 718/1 |
| 2015/0106520 A1* | 4/2015 | Breitgand | G06F 9/45558 709/226 |
| 2015/0106809 A1* | 4/2015 | Reddy | G06F 9/45533 718/1 |
| 2015/0242234 A1* | 8/2015 | Harris | G06F 9/4856 718/1 |
| 2016/0241573 A1* | 8/2016 | Mixer | H04L 63/1416 |

OTHER PUBLICATIONS

International Search Report and Written Opinion issued in Application No. PCT/SE2015/050761 dated Feb. 29, 2016, 15 pages.
Salaun G. et. al., "Verification of a Self-configuration Protocol for Distributed Applications in the Cloud", published in Assurances for Self-Adaptive Systems (J. Camara et. al.(Eds.)), LNCS 7740, pp. 60-79, 2013.

* cited by examiner

COMMISSIONING OF VIRTUALIZED ENTITIES

CROSS REFERENCE TO RELATED APPLICATION(S)

This application is a 35 U.S.C. § 371 National Stage of International Patent Application No. PCT/SE2015/050761, filed Jun. 30, 2015, designating the United States. The above identified application is incorporated by reference.

TECHNICAL FIELD

Embodiments presented herein relate to virtualization, and particularly to a method, a system, a computer program, and a computer program product for commissioning a virtualized entity.

BACKGROUND

In general terms, in computing, virtualization refers to the act of creating a virtual (rather than actual) version of something, including (but not limited to) a virtual computer hardware platform, operating system (OS), storage device, or computer network resources.

Elasticity is one aspect of a virtualization environment (both full virtualization and partial virtualization). Elasticity describes the ability of the virtualization infrastructure and an application executed on it to scale when coping with high and low demands. When demand is high, more virtual machines or containers should be launched and when demand gets low, some virtual machines and containers may be decommissioned to save resources. As herein defined, a virtualized entity will be used to refer to such a virtual machine, container, or any kind of virtualization means. Elasticity is commonly achieved by having a central management node monitoring the infrastructure status, e.g., processing unit, input/output (I/O) unit, memory unit, etc., and allowing the central management node to apply a decision procedure that informs what type of virtualized entity should be launched, how to perform provisioning, etc.

In general terms, the central management node needs to be able to decide what the virtual machines should do. In some scenarios this needs to be derived from a set of data (or network traffic) that is not necessarily occurring very frequently. For example, consider a multimedia network that handles mostly session Initiation Protocol traffic. It is likely that, at some points in time, requests are made for Constrained Application Protocol traffic.

Although such requests may not be made frequently, the central management node should still be able to handle them in an efficient manner.

In order for the central management node to be able to apply the decision procedure the central management node needs to have access to information regarding real-time status of the virtualized environment. The central management node further needs to understand all types of virtualized entities running in the infrastructure. For example, assume that there are a couple of different clusters running in the virtualized environment; one of which has high demand while the others do not. In order to launch a correct to virtualized entity, the management node needs to know what software is running in the cluster, characteristics of the cluster, etc. This will make the central management node not scalable and hence the central management node becomes a weak point in the infrastructure.

Hence, there is still a need for improved commissioning of virtualized entities.

SUMMARY

An object of embodiments herein is to provide efficient commissioning of virtualized entities.

According to a first aspect there is presented a method for commissioning a virtualized entity in a computerized virtualization environment. The method is performed by the virtualized entity. The method comprises acquiring an indication for the virtualized entity to be commissioned. The method comprises acquiring environment data from the computerized virtualization environment for determining what kind of functionality the virtualized entity is to provide. The method comprises acquiring configuration parameters based on the environment data. The method comprises applying the configuration parameters, thereby commissioning the virtualized entity.

Advantageously this provides efficient commissioning of virtualized entities.

Advantageously this allows for the central management node to take a simple mission, namely to monitor the overall performance of the infrastructure and to decide when to add a new virtualized entity and when to decommission a virtualized entity based on, for example, predefined thresholds of the processing unit, the memory, the network, etc.

Advantageously this allows for the use of a pool of virtualized entities where a set of virtualized entities can be kept alive and commissioned by other already commissioned virtualized entities in the computerized virtualization environment.

According to a second aspect there is presented a system for commissioning a virtualized entity in a computerized virtualization environment. The system comprises processing circuitry. The processing circuitry is configured to cause the virtualized entity to perform a set of operations. The set of instructions comprises the virtualized entity to acquire an indication for the virtualized entity to be commissioned. The set of instructions comprises the virtualized entity to acquire environment data from the computerized virtualization environment for determining what kind of functionality the virtualized entity is to provide. The set of instructions comprises the virtualized entity to acquire configuration parameters based on the environment data. The set of instructions comprises the virtualized entity to apply the configuration parameters, thereby commissioning the virtualized entity.

According to a third aspect there is presented a computer program for commissioning a virtualized entity, the computer program comprising computer program code which, when run on a system, causes the system to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise to herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
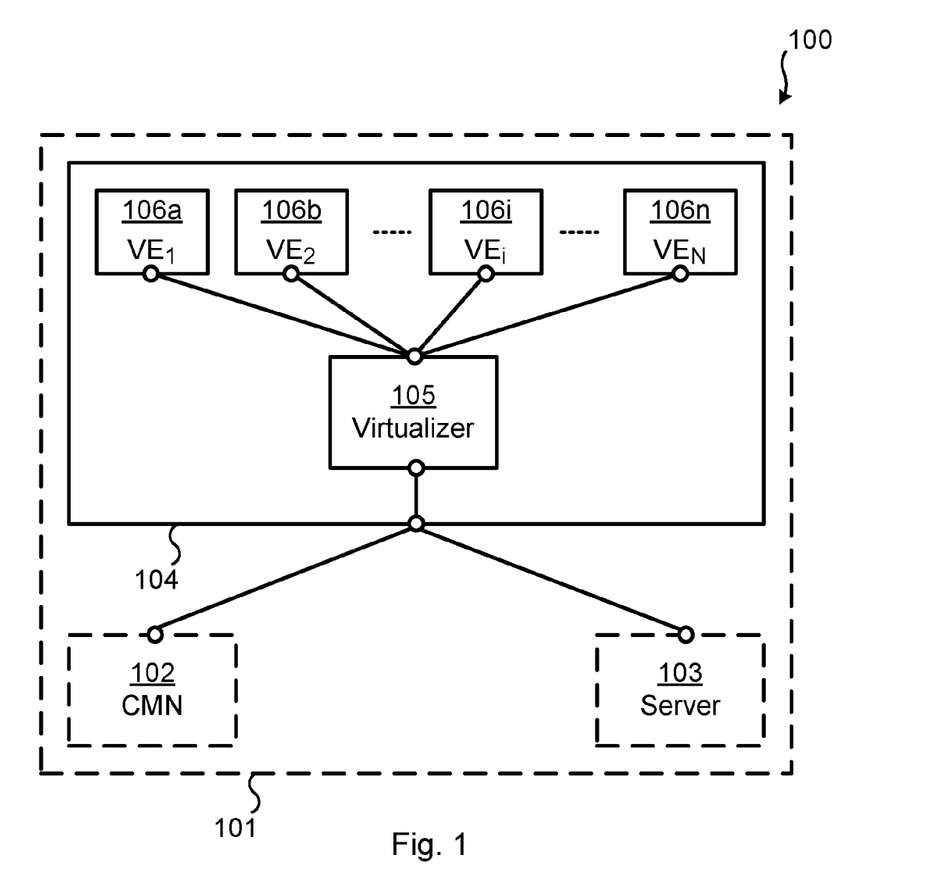
FIG. 1 is a schematic diagram illustrating a computerized virtualization environment according to embodiments.

FIG. 1 is a schematic diagram illustrating a computerized virtualization environment 104 where embodiments presented herein can be applied. The computerized virtualization environment 104 comprises a virtualizer 105 configured as an interface between virtualized entities 106a, 106b, . . . , 106i, . . . , 106n as well as between the virtualized entities 106a-106n and entities outside the computerized virtualization environment 104, such as a central management node 102 and a server 103. The computerized virtualization environment 104, the central management node 102, and the server 103 may be part of a system 101. In turn, the system 101 may be part of an infrastructure 100. The system 101 may be part of an electronic device or system, such as a node in a communications system.

As will be further disclosed below, the herein disclosed embodiments enable a virtualized entity 106i to be able to figure out which cluster of commissioned virtualized entities 106a, 106b, 106n has high demand, what software is running, what characteristics it has, and to be able to transform itself joining as a member of the cluster. The embodiments disclosed herein thus relate to commissioning a virtualized entity in a computerized virtualization environment 104. In order to obtain such commissioning there is provided a system 101, a method performed by the virtualized entity 106i, a computer program comprising code, for example in the form of a computer program product, that when run on a system 101, causes the virtualized entity 106i to perform the method.

Figure 2:
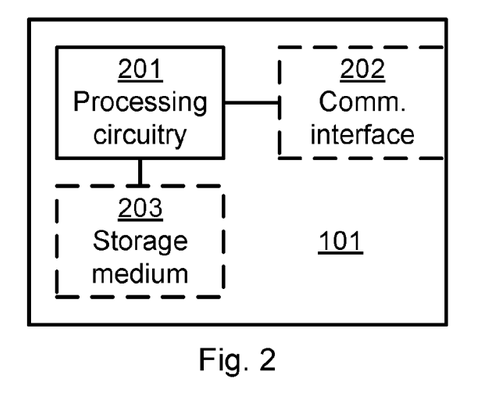
FIG. 2 is a schematic diagram showing functional units of a system according to an embodiment.

FIG. 2 schematically illustrates, in terms of a number of functional units, the components of a system 101 according to an embodiment. Processing circuitry 201 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 301 (as in FIG. 4), e.g. in to the form of a storage medium 203.

Particularly, the processing circuitry 201 is configured to cause the virtualized entity 106i to perform a set of operations, or steps, S102-S116. These operations, or steps, S102-S116 will be disclosed below. For example, the storage medium 203 may store the set of operations, and the processing circuitry 201 may be configured to retrieve the set of operations from the storage medium 203 to cause the virtualized entity 106i to perform the set of operations. The set of operations may be provided as a set of executable instructions.

Thus the processing circuitry 201 is thereby arranged to execute methods as herein disclosed. The storage medium 203 may also comprise persistent storage, which, for example, can be any single one or combination of magnetic memory, optical memory, solid state memory or even remotely mounted memory. The system 101 may further comprise a communications interface 202 for enabling communications, via a virtualizer 105, between virtualized entities 106a-106n and a central management node 102, between virtualized entities 106a-106n and a server 103, and/or between the virtualized entities 106a-106n themselves. The processing circuitry 201 controls the general operation of the system 101 e.g. by sending data and control signals to the communications interface 202 and the storage medium 203, by receiving data and reports from the communications interface 202, and by retrieving data and instructions from the storage medium 203. Other components, as well as the related functionality, of the system 101 are omitted in order not to obscure the concepts presented herein.

Figure 3:
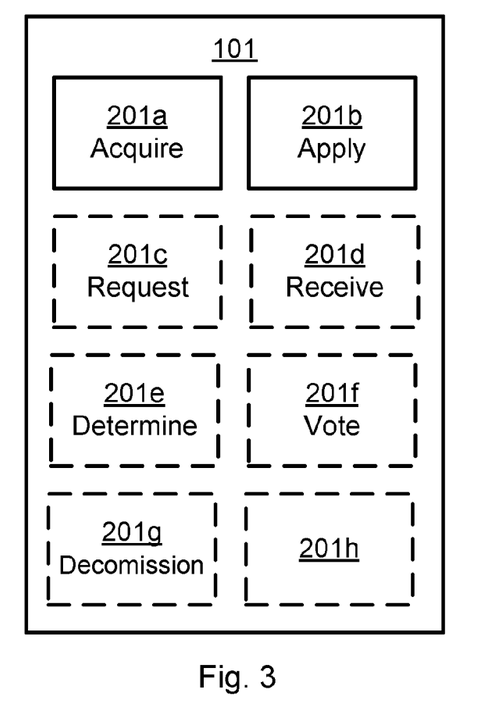
FIG. 3 is a schematic diagram showing functional modules of a system according to an embodiment.

FIG. 3 schematically illustrates, in terms of a number of functional modules, the components of a system 101 according to an embodiment. The system 101 of FIG. 3 comprises a number of functional modules; an acquire module 201a configured to cause a virtualized entity 106i to perform below steps S102, S104, S106, S112, and an apply module 201b configured to cause a virtualized entity 106i to perform below steps S106a, S108. The system 101 of FIG. 3 may further comprises a number of optional functional modules, such as any of a request module 201c configured to cause a virtualized entity 106i to perform below steps S106b, S106e, a receive module 201d configured to cause a virtualized entity 106i to perform below steps S106c, S106f, a determine module 201e configured to cause a virtualized entity 106i to perform below step S106d, a vote module 201f configured to cause a virtualized entity 106i to perform below step S114, and a decommission module 201g, configured to cause a virtualized entity 106i to perform below step S116, as well as further functional modules, as represented by module 201h. The functionality of each functional module 201a-201g will be further disclosed below in the context of which the functional modules 201a-201g may be used. In general terms, each functional module 201a-201g may be implemented in hardware or in software. Preferably, one or more or all functional modules 201a-201g may be implemented by the processing circuitry 201, possibly in cooperation with functional units 202 and/or 203. The processing circuitry 201 may thus be arranged to from the storage medium 203 fetch instructions as provided by a functional module 201a-201g and to execute these instructions, thereby performing any steps as will be disclosed hereinafter.

The system 101 may be provided as a standalone device or as a part of at least one further device. One type of device on which the herein disclosed embodiments may be implemented is the hyperscale datacenter system denoted ERICSSON HDS 8000. In general terms, the system 101 may be provided in a node of a radio access network, in a node of a core network, or in a node of a service network. Alternatively, functionality of the system 101 may be distributed between at least two devices, or nodes (such as distributed between at least two ERICSSON HDS 8000). These at least two nodes, or devices, may either be part of the same network part (such as the radio access network or the core network or the service network) or may be spread between at least two such network parts. In this respect, at least part of the system 101 may reside in the radio access network, such as in a radio access network node, for cases when embodiments as disclosed herein are performed in real time.

Thus, a first portion of the instructions performed by the system 101 may be executed in a first device, and a second portion of the of the instructions performed by the system tot may be executed in a second device; the herein disclosed embodiments are not limited to any particular number of devices on which the instructions performed by the system 101 may be executed. Hence, the methods according to the herein disclosed embodiments are suitable to be performed by a system 101 residing in a cloud computational environment. Therefore, although a single processing circuitry 201 is illustrated in FIG. 2 the processing circuitry 201 may be distributed among a plurality of devices, or node. The same applies to the functional modules 201a-201h of FIG. 3 and the computer program 402 of FIG. 4 (see below).

Figure 4:
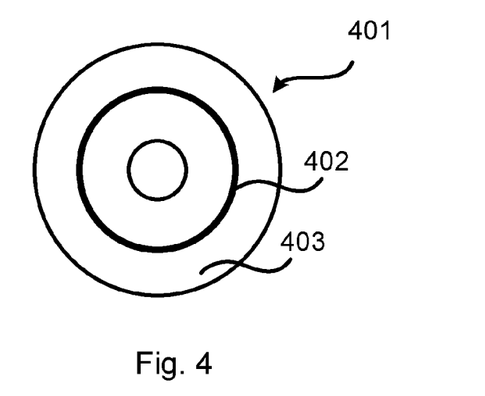
FIG. 4 shows one example of a computer program product comprising computer readable means according to an embodiment.

FIG. 4 shows one example of a computer program product 401 comprising computer readable means 403. On this computer readable means 403, a computer program 402 can be stored, which computer program 402 can cause the processing circuitry 201 and thereto operatively coupled entities and devices, such as the communications interface 202 and the storage medium 203, to execute methods according to embodiments described herein. The computer program 402 and/or computer program product 401 may thus provide means for performing any steps as herein disclosed.

In the example of FIG. 4, the computer program product 401 is illustrated as an optical disc, such as a CD (compact disc) or a DVD (digital versatile disc) or a Blu-Ray disc. The computer program product 401 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 402 is here schematically shown as a track on the depicted optical disk, the computer program 402 can be stored in any way which is suitable for the computer program product 401.

Figure 5:
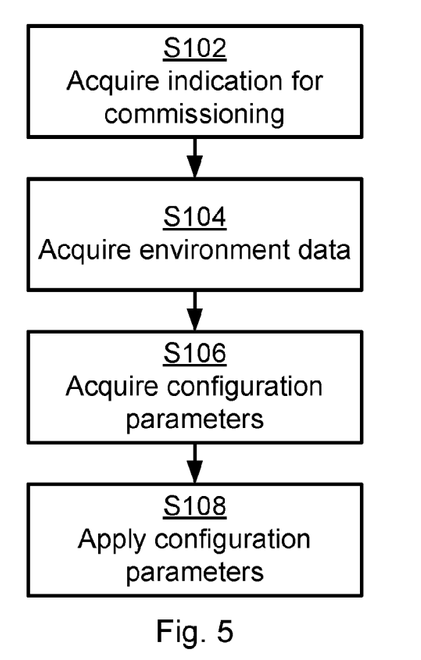
FIGS. 5 and 6 are flowcharts of methods according to embodiments.
Figure 6:
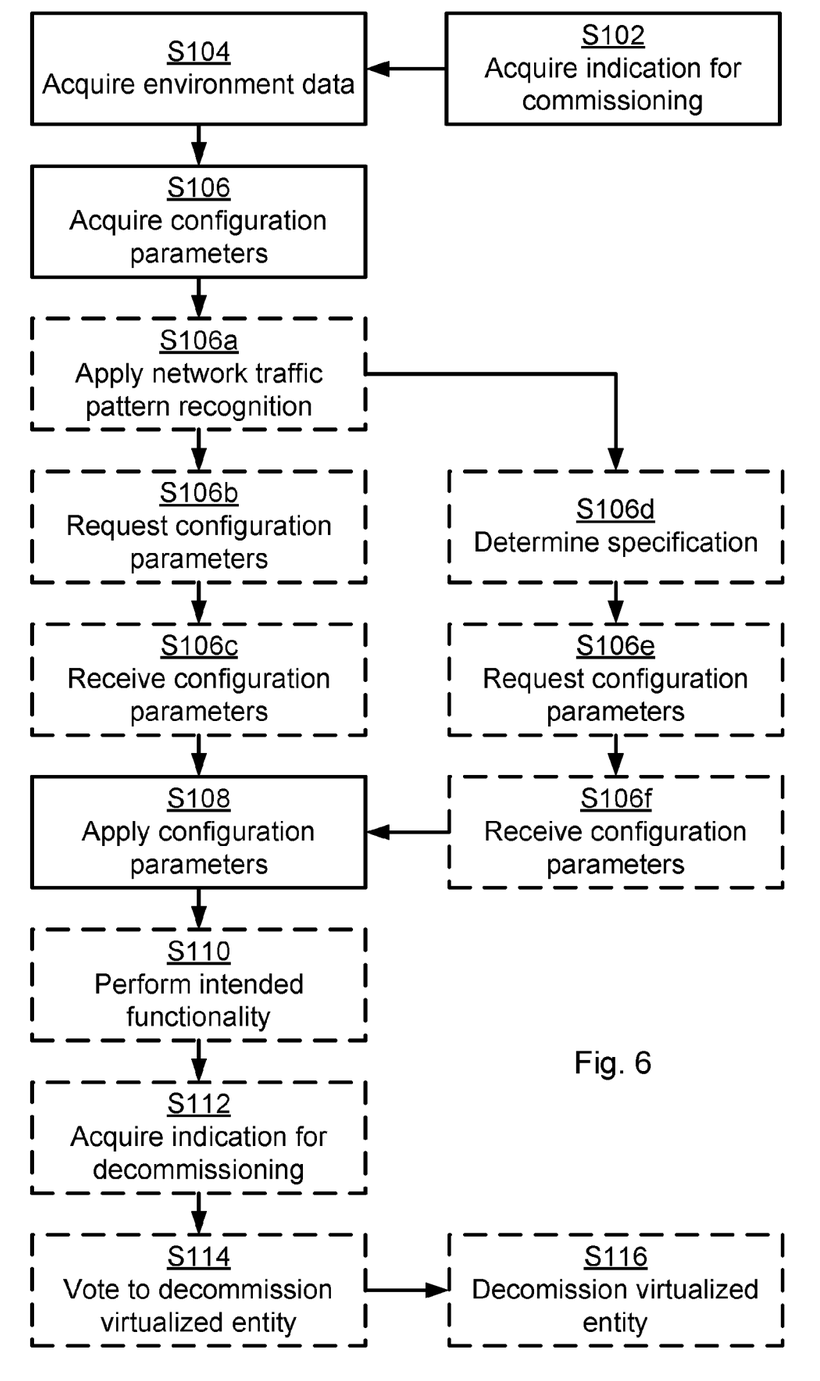

FIGS. 5 and 6 are flow charts illustrating embodiments of methods for commissioning a virtualized entity 106i in a computerized virtualization environment 104. The methods are performed by the virtualized entity 106i. The methods are advantageously provided as computer programs 302.

Reference is now made to FIG. 5 illustrating a method for commissioning a virtualized entity 106i in a computerized virtualization environment 104 as performed by a virtualized entity 106i according to an embodiment. Parallel reference is made to the signalling diagrams of FIGS. 7 and 8.

The virtualized entity 106i is configured to, in a step S102, acquire an indication for the virtualized entity 106i to be commissioned. Examples of how the virtualized entity 106i may acquire the indication will be provided below.

Upon having the indication the virtualized entity 106i needs to know what functionality it is to perform. The virtualized entity 106i is therefore configured to, in a step S104, acquire environment data from the computerized virtualization environment 104 for determining what kind of functionality the virtualized entity 106i is to provide. Examples of environment data will be provided below.

Once the virtualized entity 106i has acquired the environment data the virtualized entity 106i can acquire configuration parameters. The virtualized entity 106i is thus configured to, in a step S106, acquire configuration parameters based on the environment data. Examples of configuration parameters and how the configuration parameters may be acquired will be provided below.

The virtualized entity 106i is then configured to, in a step S108, apply the configuration parameters, thereby commissioning the virtualized entity.

This provides a self-organized virtualization environment 104 where the virtualized entities 106a-106n are enabled to apply self-provisioning and join a cluster of commissioned virtualized entities 106a-106n.

The newly launched virtualized entity 106i may be bootstrapped with a minimized kernel and reasoning utilities which can be utilized to reason about the other virtualized entities 106a, 106b, 106n running in the infrastructure. When the virtualized entity 106i recognizes which cluster has a high demand, and how to become a member of that cluster it will install required software, apply self-provisioning and self-configuration, and join the cluster.

Reference is now made to FIG. 6 illustrating methods for commissioning a virtualized entity 106i in a computerized virtualization environment 104 as performed by a virtualized entity 106i according to further embodiments. Parallel reference is continued to the signalling diagrams of FIGS. 7 and 8.

According to one embodiment centralized management is required to monitor overall performance of the virtualization infrastructure. Compared with a known central management node having similar functionalities, the herein disclosed central management node only needs to be configured to monitor performance, to add and decommission virtualized entities, and does not need to know how to provision virtualized entities.

A knowledgebase node may be implemented in the server 103 and be configured to act as a storage containing configuration parameters that describe how to provision virtualized entities 106a-106n of different types, together with common and domain-specific knowledge. In this respect, the configuration parameters may be regarded as blueprints, or templates.

In this respect, the common domain-specific knowledge could for example comprise what the processing usage, memory usage, or network usage is, possibly in combination with what kind of virtualization technology is being used in current infrastructure and what characteristics it has. Knowledge may come from a domain expert or be acquired as a result of machine learning procedure. Further, the configuration parameters may identify at least one software suite to be installed on the virtualized entity 106i. Additionally or alternatively, the configuration parameters may describe how to perform self-provisioning and/or self-configuration.

An example of a blueprint, or template (as defined by the configuration parameters), may be specified as follows. To transform into an Elasticsearch node, the following software suites shall be installed and such a configuration shall be applied. For example:
name: Elasticsearch
installation:
    apt-get install oracle-jdk
    apt-get install elasticsearch
configuration:
    echo " . . . ">>/etc/elasticsearch.conf
    sed " . . . "</etc/elasticsearch.conf Given network-sniffing data, performance statistics, and/or knowledge, a reasoning node can apply mechanisms such as logical reasoning, machine learning, and pattern recognition to deduce what kind of node the newly added virtualized entity should become. Hence, according to an embodiment the environment data comprises network traffic information of the computerized virtualization environment. The virtualized entity 106i may then be configured to acquire the configuration parameters by, in a step S106a, apply network traffic pattern recognition to the network traffic information.

The aforementioned reasoning process may thus includes (but not be limited to) the virtualized entity 106i applying pattern recognition by sniffing network traffic to identify clusters, gather real-time statistics of the computerized virtualization environment such as processing usage, input/output (IO) usage, memory usage, fetching configuration parameters of the targeted cluster in order to understand what software to install, and how to perform self-provisioning and self-configuration.

The reasoning node may be implemented in the server 103. However, in some embodiments the functionality of the reasoning node is implemented in the virtualized entity 106i and hence the reasoning node may not exist as a separated entity.

According to one embodiment the configuration parameters are acquired from the knowledgebase (as defined by the server 103), without reasoning being applied in the virtualized entity 106i. The virtualized entity 106i is in this embodiment configured to acquire the configuration parameters by, in a step S106b, request configuration parameters from the server 103 by providing the environment data to the server 103; and, in a step S106c, receive the configuration parameters from the server 103 in response thereto.

According to one embodiment the configuration parameters are acquired from the knowledgebase (as defined by the server 103), with reasoning being applied in the virtualized entity 106i. The virtualized entity 106i is in this embodiment configured to acquire the configuration parameters by, in a step S106d, determine a specification identifying configuration parameters based on the environment data; in a step S106e, request the configuration parameters from the server 103 by providing the specification to the server 103; and, in a step S106f, receive the configuration parameters from the server 103 in response thereto.

The following table illustrates one embodiment of mapping between port, regular expression, and configuration parameters. This table can be utilized in the process of reasoning, where different communication patterns are identified (or sniffed) over the network and where the result of this identification is, by the virtualized entity 106i, mapped to the installation of certain software as defined in the configuration parameters.

TABLE 1

Mapping between port, regular expression and configuration parameters for a bootstrapped virtualized entity.

| Port | Regular Expressions | Configuration parameters |
| --- | --- | --- |
| 80 | (.*User-agent: Mochiweb.*|.*User-agent: nginx.*) | nginx_version_1.yaml |
| 9200 | *{shards:.*}.* | elastic_search_1.4.3.yaml |

In one embodiment the indication in S102 is acquired from a central management node 102 of the computerized virtualization environment, and the indication comprises bootstrapping instructions for the virtualized entity.

Embodiments relating to decommissioning of the virtualized entity 106i will now be disclosed. The virtualized entity 106i may be configured to, in a step S112, acquire an indication to decommission a virtualized entity 106a-106n in the computerized virtualization environment 104. As will be disclosed next, there may be different ways to decommission the virtualized entity 106i.

One embodiment concerns decommissioning of the virtualized entity 106i in the presence of the central management node 102. For example, the central management node 102 may broadcast a decommission message to all virtualized entities where monitoring agents are running. The indication to decommission the virtualized entity is in this embodiment acquired from the central management node 102 of the computerized virtualization environment 104.

One embodiment concerns decommissioning of the virtualized entity 106i without the presence of the central management node 102. For example, the bootstrapped virtualized entities themselves may form a cluster and take the responsibility to add and decommission. The indication to decommission the virtualized entity is in this embodiment acquired from a peer virtualized entity 106a, 106b, 106n in the computerized virtualization environment 104.

In both these embodiments the virtualized entities 106a-106n may then vote which virtualized entity should be decommissioned (or even terminate). Hence, the virtualized entity 106i may be configured to, in a step S114, vote regarding which virtualized entity 106a-106n in the computerized virtualization environment 104 to decommission.

The to-be-decommissioned virtualized entity may then decommission itself. Hence, the virtualized entity 106i may be configured to, in a step S116, decommission the virtualized entity 106i. Termination is not necessary; the virtualized entity 106i could return to a bootstrapped state or return to the pool.

Although according to these embodiments the virtualized entity 106i is decommissioned it is to be understood that any of the virtualized entities 106a-106n could be decommissioned in steps S112-S116.

Figure 7:
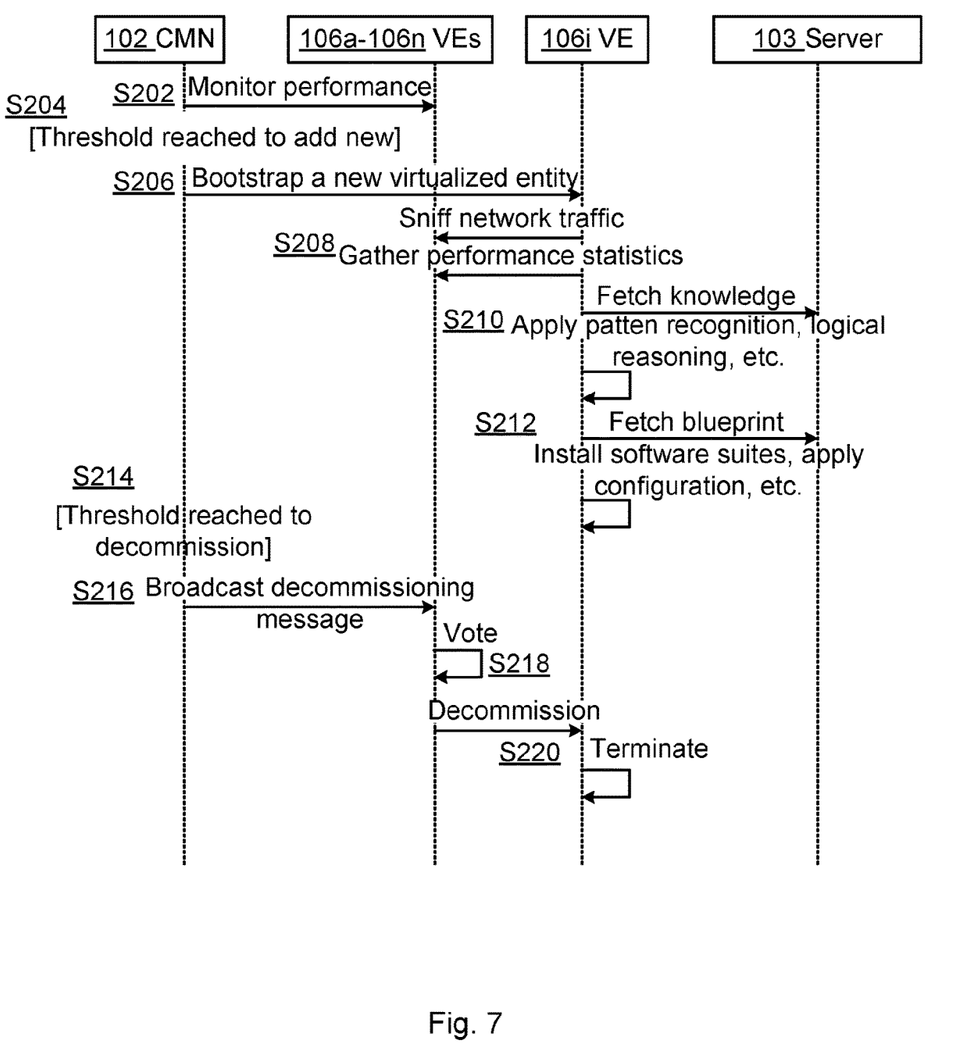
FIGS. 7 and 8 are signalling diagrams according to embodiments.

FIG. 7 is a sequence diagram illustrating the sequence of bootstrapping, transforming, and decommissioning of a virtualized entity in the presence of a central management node 102 according to an embodiment.

S202: The central management node 102 monitors infrastructure performance continuously.

S204: If a threshold to add a new virtualized entity 106i has been reached, then steps S206, S208, S210, and S212 are performed.

S206: The central management node 102 creates a new virtualized entity 106i and bootstraps it.

S208: The newly created virtualized entity 106i gathers information by sniffing the network, collecting performance statistics, and fetching knowledge from the server 103.

S210: The newly created virtualized entity 106i applies techniques such as logical reasoning, pattern recognition to figure out what kind of virtualized entity it should transform into.

S212: The newly created virtualized entity 106i acquires the corresponding configuration parameters, installs software suites, and applies configurations.

S214: If a threshold to decommission a virtualized entity 106i has been reached steps S216, S218, and S220 are performed.

S216: The central management node 102 broadcasts a decommission message to all virtualized entities 106a-106n where monitoring agents are running.

S218: The virtualized entities 106a-106n vote which virtualized entity should terminate.

S220: The to-be-decommissioned virtualized entity 106i terminates itself.

In one embodiment the indication the indication in step S102 is acquired from a peer virtualized entity 106a, 106b, 106n in the computerized virtualization environment, and the virtualized entity 106i already is bootstrapped when acquiring the indication.

Figure 8:
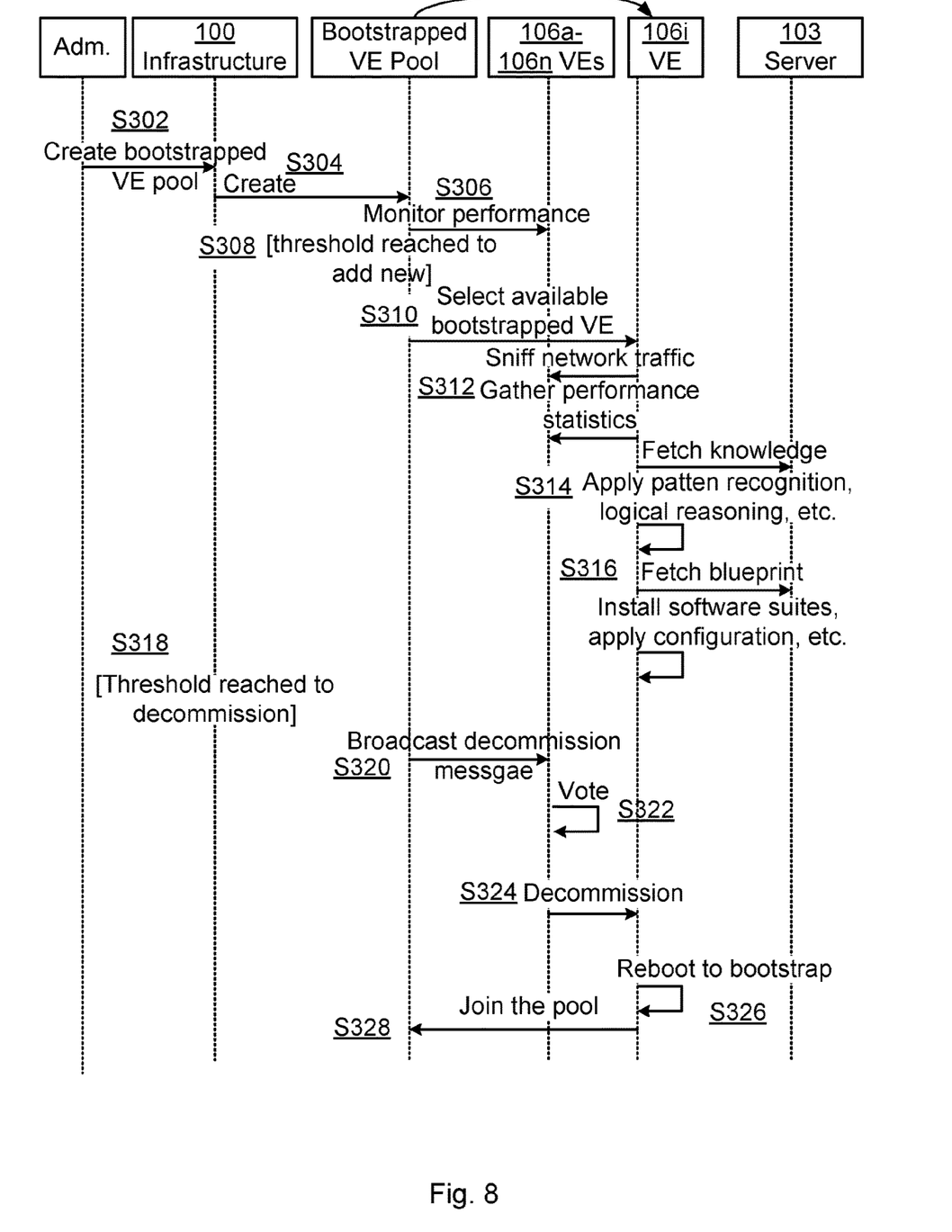

FIG. 8 is a sequence diagram illustrating the sequence of bootstrapping, transforming, and decommissioning of a virtualized entity without presence of a central management node 102 according to an embodiment.

In general terms, the sequence of steps in FIG. 8 is similar to the sequence of steps in FIG. 7 except that there is no centralized management node 102 to monitor performance, and instead the bootstrapped virtualized entities 106a-106n themselves form a cluster and take the responsibility to add and decommission virtualized entities 106a-106n.

S302: Instructions to create a pool of virtualized entities is received from an administrating node.

S304: A pool of bootstrapped virtualized entities is created by the virtualization environment.

S306: The pool of bootstrapped virtualized entities monitors infrastructure performance continuously.

S308: If a threshold to add a new virtualized entity 106i has been reached, then steps S310, S312, S314, and S316 are performed.

S310: One of the virtualized entities 106i of the virtualized entities in the pool is selected to be commissioned.

S312: The newly created virtualized entity 106i gathers information by sniffing the network, collecting performance statistics, and fetching knowledge from the server 103.

S314: The newly created virtualized entity 106i applies techniques such as logical reasoning, pattern recognition to figure out what kind of virtualized entity it should transform into.

S316: The newly created virtualized entity 106i acquires the corresponding configuration parameters, installs software suites, and applies configurations.

S318: If a threshold to decommission a virtualized entity 106i has been reached steps S320, S322, S324, S326, and S328 are performed.

S320: A decommission message is broadcast from the pool of bootstrapped virtualized entities to all virtualized entities 106a-106n where monitoring agents are running.

S322: The virtualized entities 106a-106n vote which virtualized entity should terminate.

S324: The to-be-decommissioned virtualized entity 106i is decommissioned.

S326: The decommissioned virtualized entity 106i is re-booted to bootstrap.

S328: The re-booted virtualized entity 106i joins the pool.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, although the functionality of the virtualized entity 106i has been described in a software based computerized virtualization environment 104 the herein disclosed embodiments are equally applicable to a hardware based computerized virtualization environment 104. Hence, the pool of virtualized entities may be defined by a a pool of so-called "white-labeled" devices (where each device corresponds to a virtualized entity) which can be deployed in case of either device failure or increasing demand; these white-labeled devices can transform themselves into target devices by installing/activating corresponding software suites and applying configurations. Further, although not mentioned explicitly, at least some of the herein disclosed embodiments are based on utilizing the promiscuous mode. In computer networking, promiscuous mode, or promise mode, is a mode for a wired network interface controller (NIC) or wireless network interface controller (WNIC) that causes the controller (in the present case: the virtualizer 105) to pass all traffic it receives to a central processing unit (in the present case: the virtualized entities 106a-106n) rather than passing only the frames that the controller is intended to receive. Promiscuous mode is commonly used for packet sniffing that takes place on a router or on a computer connected to a hub (instead of a switch) or one being part of a wireless local area network. Interfaces are placed into promiscuous mode by software bridges often used with hardware virtualization. The promiscuous mode is available on the Ethernet in order to identify what action the virtualized entity should perform. This is in contrast to setting up a direct channel (e.g. a Transmission Control Protocol connection) in order to communicate directly with the virtualized entities and instruct the virtualized entities what action to perform.

The invention claimed is:

1. A method for configuring a first virtualized entity in a computerized virtualization environment, the method comprising:

the first virtualized entity acquiring environment data from the computerized virtualization environment for determining what kind of functionality the first virtualized entity is to provide;

after acquiring the environment data, the first virtualized entity determining, based on the acquired environment data, a functionality the first virtualized entity is to provide;

the first virtualized entity acquiring configuration parameters based on the acquired environment data;

the first virtualized entity configuring itself based on the acquired configuration parameters, wherein the configuring comprises the first virtualized entity applying the acquired configuration parameters;

before the first virtualized entity acquires the environment data from the computerized virtualization environment, a central management node (CMN) of the computerized virtualization environment monitoring performance of the computerized virtualization environment; and before the first virtualized entity acquires the environment data from the computerized virtualization environment, the CMN determining whether a condition to add a virtualized entity to the computerized virtualization environment is satisfied, wherein the first virtualized entity is created as a result of the CMN determining that the condition is satisfied.

2. The method of claim 1, further comprising:
a second virtualized entity monitoring performance of the computerized virtualization environment;
the second virtualized entity determining whether a condition is satisfied; and
as a result of determining that the condition is satisfied, triggering the first virtualized entity to acquire the environment data from the computerized virtualization environment.

3. The method of claim 1, wherein the environment data comprises real-time statistics of the computerized virtualization environment, said real-time statistics comprising one or more of: real-time statistics pertaining to processing usage, real-time statistics pertaining to input/output usage, and real-time statistics pertaining to memory usage.

4. The method of claim 1, wherein the environment data comprises network traffic information of the computerized virtualization environment, and wherein acquiring the configuration parameters comprises:
applying network traffic pattern recognition to the network traffic information.

5. The method of claim 1, wherein acquiring the configuration parameters comprises:
requesting configuration parameters from a server by providing the environment data to the server; and
receiving the configuration parameters from the server in response thereto.

6. The method of claim 1, wherein acquiring the configuration parameters comprises:
determining a specification identifying configuration parameters based on the environment data; and
requesting the configuration parameters from a server by providing the specification to the server; and
receiving the configuration parameters from the server in response thereto.

7. The method of claim 1, further comprising:
acquiring an indication to decommission a virtualized entity in the computerized virtualization environment.

8. The method of claim 7, wherein the indication to decommission the virtualized entity is acquired from a central management node of the computerized virtualization environment.

9. The method of claim 7, wherein the indication to decommission the virtualized entity is acquired from a peer virtualized entity in the computerized virtualization environment.

10. The method of claim 7, further comprising:
voting regarding which virtualized entity in the computerized virtualization environment to decommission.

11. The method of claim 7, further comprising:
decommissioning the virtualized entity.

12. The method of claim 1, wherein the configuration parameters identify at least one software suite to be installed on the virtualized entity.

13. The method of claim 1, wherein the configuration parameters describe how to perform self-provisioning and self-configuration.

* * * * *